Feb. 10, 1970     A. D. LE VANTINE     3,494,231
METHOD OF MAKING A FACET OF A MULTI-FACET
PARABOLOIDAL COLLIMATOR
Filed July 26, 1967     5 Sheets-Sheet 1

Allan D. Le Vantine
INVENTOR.

BY
ATTORNEY

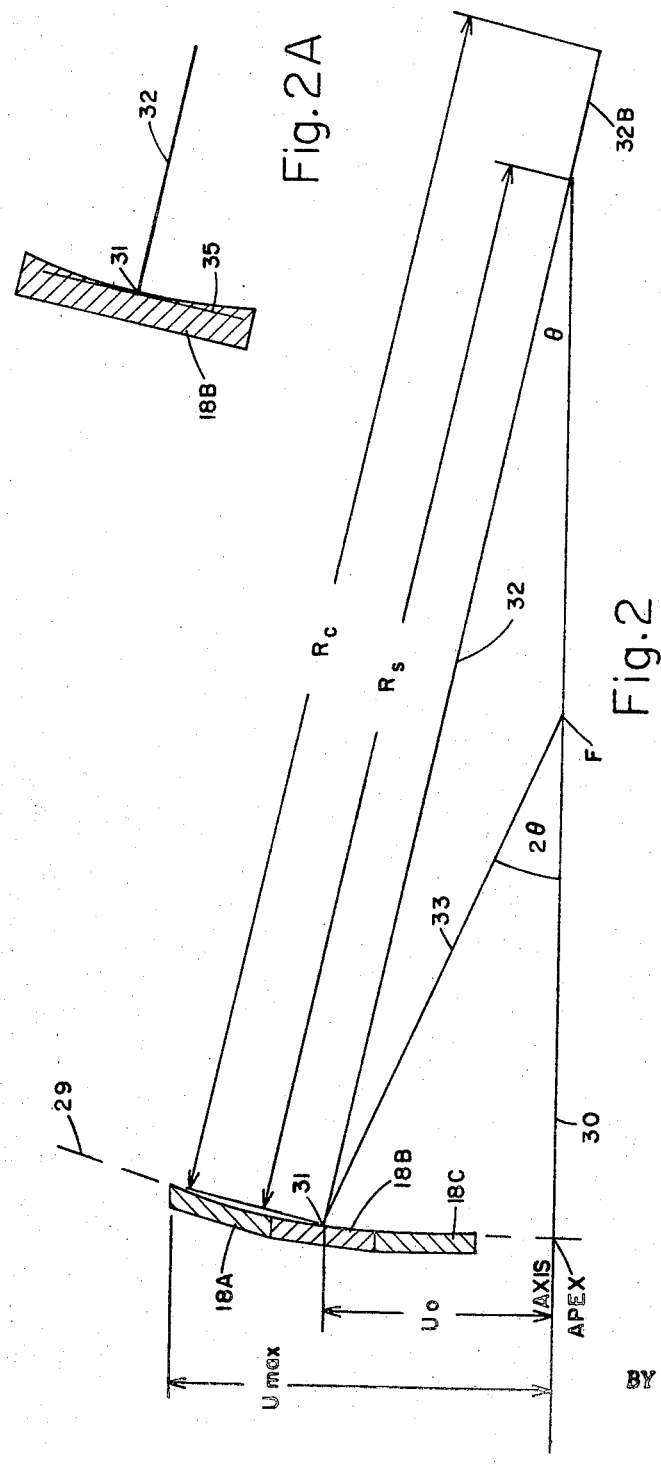

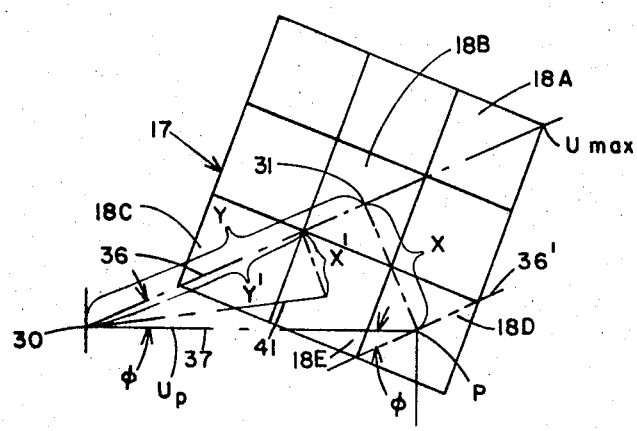
Fig. 3B
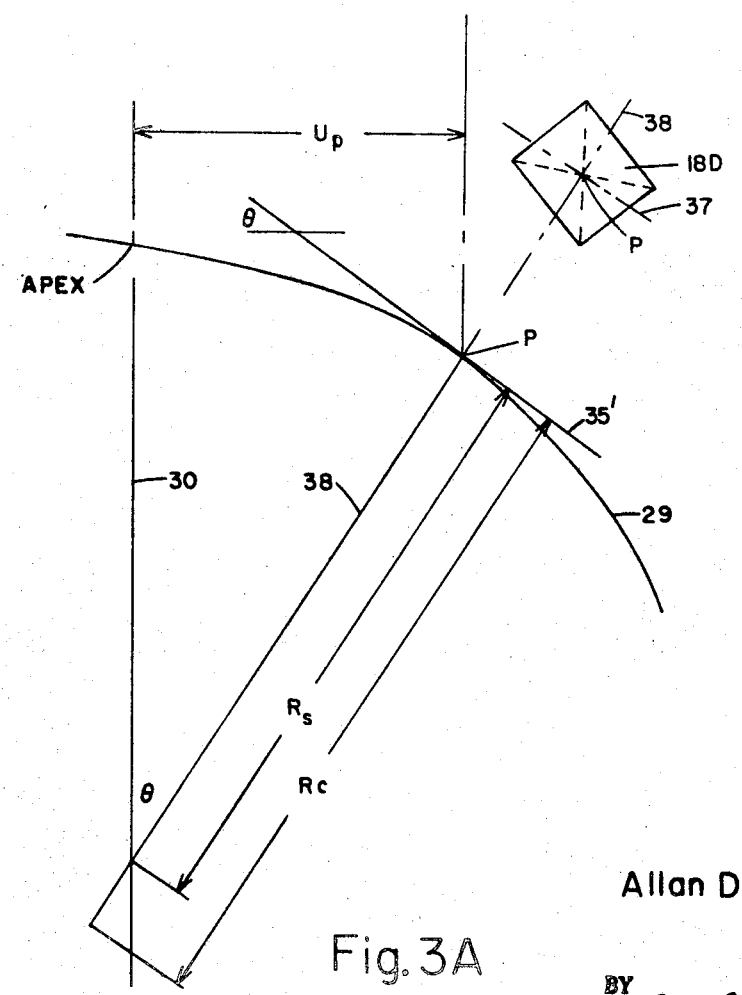
Fig. 3C
Fig. 3A
Allan D. Le Vantine
INVENTOR
ATTORNEY Feb. 10, 1970  A. D. LE VANTINE  3,494,231
METHOD OF MAKING A FACET OF A MULTI-FACET
PARABOLOIDAL COLLIMATOR
Filed July 26, 1967  5 Sheets-Sheet 4

Allan D. Le Vantine
INVENTOR

BY
ATTORNEY

Allan D. LeVantine
INVENTOR

BY
ATTORNEY

United States Patent Office 3,494,231
Patented Feb. 10, 1970

3,494,231
METHOD OF MAKING A FACET OF A MULTI-FACET PARABOLOIDAL COLLIMATOR
Allan D. Le Vantine, Tarzana, Calif., assignor to TRW Inc., Redondo Beach, Calif., a corporation of Ohio
Filed July 26, 1967, Ser. No. 656,093
Int. Cl. B26d 7/14
U.S. Cl. 83—17    8 Claims

ABSTRACT OF THE DISCLOSURE

A method for making a facet of a light reflecting collimator composed of a plurality of facets each having a substantially paraboloidal surface on individual plates and each facet formed on each plate being defined by two paraboloidal radii lying in orthogonal planes.

BACKGROUND OF THE INVENTION

In the prior art paraboloidal collimators have been generally small and formed as a single element. In a solar simulator, for example, where a relatively large reflecting collimator is required, it would be very expensive to form the structure of a single element in that the material used is relatively rigid and heavy, and the paraboloidal surface would have to be ground into it. This would be an obviously difficult and time-consuming effort. By forming a substantially paraboloidal surface on a plurality of relatively small sections, great savings of time and expense have been accomplished. The invention provides a substantial simplification over that which would normally be used for grinding and polishing a surface of the required contour. This is especially true for producing the required surface upon a metal plate, such as aluminum which is used in solar simulators. In the manufacture of four collimators for a solar simulator, using the present invention, approximately three quarters of a million dollars was saved over what the cost of grinding true paraboloidal surfaces would have been.

SUMMARY OF THE INVENTION

It is the object of the invention to provide a method for producing a surface on a flat metal or other relatively rigid plate, such as glass, defined by two radii of curvature in orthogonal planes.

Another object of the invention is to provide a jig for making a facet of a substantially paraboloidal collimator.

It is still another object of the invention to provide a method for making a collimator having a substantially paraboloidal surface formed of a plurality of paraboloidal facets upon individual plates, each facet being defined by two paraboloidal radii in orthogonal planes.

It is a further object of the invention to provide a collimator having a substantially paraboloidal surface and formed of a plurality of juxtaposed facets each having a paraboloidal surface.

Further objects and advantages of the invention may be brought out in the following part of the specification wherein small details have been described for the competence of disclosure.

BRIEF DESCRIPTION OF THE DRAWINGS

Referring to the accompanying drawings, which are for illustrative purposes:

FIG. 2 is a side cross-sectional and diagrammatic view of a central row of facets of a collimator illustrating portions of the parabola geometry as they relate to the invention;

FIG. 2A is an enlarged view of the center facet shown in FIG. 2;

FIG. 3A is a side diagrammatic view illustrating the geometry of a paraboloid as it relates to the center point of a specific off-center facet of the collimator according to the invention;

FIG. 3B is a plan view of a collimator, viewed along lines parallel to the axis of the parabola, projected from FIG. 3A;

FIG. 3C is a true view of the facet whose center point and a tangent thereto is illustrated in FIG. 3A, viewed normal to the tangent plane;

DESCRIPTION OF THE PREFERRED EMBODIMENTS

Figure 1:
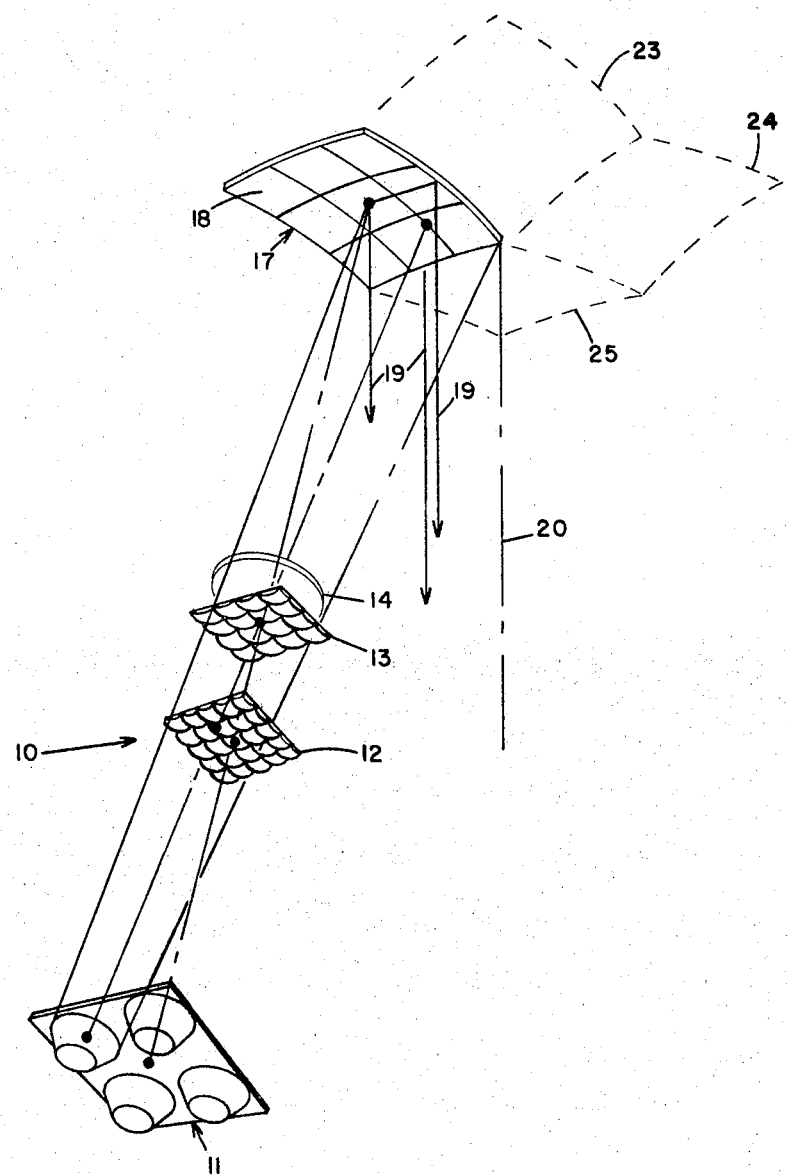
FIG. 1 is a diagrammatic view of portions of a solar simulator employing paraboloidal collimators made according to the invention.

Referring to FIG. 1, there are shown portions of a solar simulator, generally indicated as 10, diagrammatically illustrated. The solar simulator is comprised of a plurality of light sources and their collectors, generally indicated at 11, in optical alignment with an input mosaic lens 12, output mosaic lens 13 and an aligning lens 14. The beams produced by the light sources, after passing through the lenses, are reflected by an off-axis, substantially paraboloidal collimator 17, comprised of nine substantially paraboloidal facets 18, each defined by two radii of curvature in orthogonal planes. The parallel light rays 19 are reflected downwardly from the collimator parallel to a center line 20 of a test chamber, not shown. The test chamber has four other collimators 23, 24 and 25, forming reflective portions of a total solar simulator apparatus.

Figure 9:
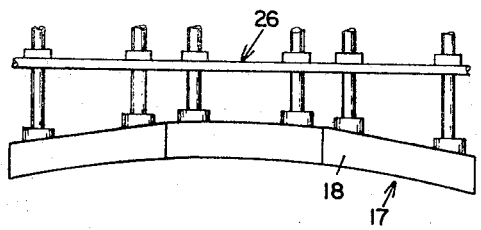
FIG. 9 is a fragmentary view of a collimator illustrating means for securing the various facets together.

The facets 18 are made from aluminum alloy plates and are suspended in a nearly horizontal position from a rigid thermally stabilized rack, generally indicated as 26 in FIG. 9. The rack is constructed of tubular members running generally horizontally with respect to the collimator and fluid is circulated through the tubular members to thermally stabilize the structure. The tubular members are adjustable to provide means to properly align each facet so as to form the substantially paraboloidal collimator. Thermal stabilization of the rack eliminates the possibility of any movement of aligned facets when the space simulation chamber is under a vacuum and having liquid nitrogen in the panels lining the walls of the chamber.

In FIG. 2 there is shown a cross-sectional view of the collimator 17 illustrating the reflective faces of the facets 18A, 18B and 18C on a predetermined parabolic curve 29. The parabola 29 has an axis 30 and a focus point F. In designing the solar simulator, it was determined that the center point 31 of the collimator should be off-axis, an angle equal to $2\theta$, specifically 26°, the angle being formed by the parabolic axis and the line 33 from the focus to the center point 31. As is known, in a parabola a line 32 drawn normal to a tangent 35, as shown in FIG. 2A, to the point 31, intersects the parabolic axis at an angle $\theta$, half of $2\theta$. Similarly, the lines 32 and 33 also form an angle equal to $\theta$.

In any paraboloid a line, such as 32, has the length of a radius $R_s$ in a plane perpendicular to the face of the drawing. The radius $R_s$ defines the curvature of the paraboloid at point 31 in the aforesaid plane. A second radius $R_c$, longer than $R_s$ as indicated by the extension 32B of the line 32, is in the plane of the face of the drawing, normal to the plane of the radius $R_s$, and together the two radii in the respective orthogonal planes determine the surface of a facet as 18B at the point 31. That is, at each such point, there are two radii in orthogonal planes that define that portion of the surface of a paraboloid. At locations off the point 31 in the facet 18B, the radii vary slightly from $R_s$ and $R_c$, but the size of 18B, as well as that of the other facets, is selected so that the deviation is minor so as not to be of any consequence for purposes for the invention.

At the center 31 of the facet, the two radii defining the paraboloid can be defined as $$R_{so} = \frac{2F}{\cos \theta_o}$$

where F is the focal length and $\theta$ is the angle as indicated above; and $$R_{co} = \frac{2F}{\cos^3 \theta_o}$$

The angle $\theta$ is determined by the equation, $$\theta_o = \tan^{-1}\left(\frac{U_o}{2F}\right)$$

where $U_o$ is the distance to the center of the facet from the paraboloid axis. At any other location the two radii of the paraboloid are:

$$R_s = \frac{2F}{\cos \theta}, \; R_c = \frac{2F}{\cos^3 \theta} \text{ and } \theta = \tan^{-1}\left(\frac{U}{2F}\right)$$

where U is the distance of another point from the paraboloid axis. Each collimator facet, according to the invention, is defined by the two radii $R_{so}$ and $R_{co}$ at all points on the facet surface and the size of the facet must be chosen so that the deviation in the radii of curvature of the facet from those of a paraboloid for any location will be small and insignificant.

For example, a typical computation for these variations is indicated in the following, where F=19.3 feet, $U_o$=10.3 feet, and U=11.7 feet, then $\theta_o$=14.9°, $R_{so}$=39.9 feet, $R_{co}$=42.75 feet, $\theta$=16.9°, $R_s$=40.35 feet, and $R_c$=44.15 feet. However, the difference in illumination from that of the true paraboloid and the collimator made according to the invention is 0.043 which is insignificant for the illumination purposes required. Thus, as a matter of practice for the collimator according to the invention, it is sufficiently accurate to treat the radii of each facet for all points thereon as $R_s$ and $R_c$, determined at each center point, the distance from the parabolic axis to the respective center points being considered to have a value equal to a respective U. It should be noted that $U_{max}$, as shown in FIGS. 2 and 3B, is predetermined for the collimator in accordance with the area to be illuminated and is measured from the axis to the center point of the space simulator above the area illuminated.

Further, it should be noted that the intersection of the collimator facets are visible from the test zone of the simulator, the area to be illuminated, and these intersections block some of the light coming from the source image, the image appearing across the intersections on the collimator. This results in a local decrease of illumination in the test zone, but this decrease is made insignificant by closely butting the facets.

For each facet, F of the paraboloid being known, in order to determine the two radii, it is necessary to determine the angle $\theta$ from the equation, $$\theta = \tan^{-1}\frac{U}{2F}$$

The distance U for each center point may be determined in reference to FIGS. 3A, 3B, and 3C. In FIG. 3B, the axis 30 of the parabola is shown as a point, the axis being perpendicular to the surface of the drawing. The position of a vertical plane or line 36 is determined with respect to its position to the test zone or area to be illuminated by the collimator 17. That is, the line 36 extends from the axis of the parabola to the point $U_{max}$, which is determined to be at the center of a test chamber having a solar simulator. Stated differently, the collimator is positioned so that it will provide the proper illumination upon the test zone or target. Thus, by using the line 36 as a diagonal through the center of the rectangular collimator its length and angular position are known.

The collimator in FIG. 3B is shown to be comprised of nine facets, each two square feet, for example. The individual facets, as well as the collimator, are square only when viewed along lines parallel to the parabolic axis. In such an arrangement the center points of each facet are easily determined as being at the intersection of the diagonals of known squares. To determine the distance, $U_p$, from the point P, the center of the facet 18D, to the axis in the vertical plane 37 in FIG. 3B and on the drawing surface in FIG. 3A, it is necessary to determine the length of the lines indicated as X and Y, the two sides of the right triangle of which $U_p$ is the hypotenuse. The line X is equal to the length of the diagonal of a two foot square and Y is equal to $U_{max}$ minus the length of a diagonal and a half of the two foot squares. Thus, the angle $\theta$ for the point P, shown in FIG. 3A, for the known parabola and the radii $R_s$ and $R_c$ for the point P may be calculated from the equations above.

The radius $R_c$ lies in the plane 37. The radius $R_s$ is in a plane indicated by the line 38, the latter plane being normal to the plane 37, the two being the orthogonal planes having the two radii which define the curvature of the facet 18D. In FIG. 3A, the tangent line or plane 35' is perpendicular to the line 38 and is analogous to the tangent 35 in FIG. 2. The facet 18D is projected in FIG. 3C, as viewed normal to the tangent plane 35'. In this view the facet 18D is a parallelogram having two long sides and two short sides and is not a rectangle, the lengths of the sides being 24.5297 and 24.1379 inches, for example.

To determine the values of U and the radii for the other facets, other than those on the line 36 where the distances to the center points are either known or obvious by subtracting diagonals or diagonal portions from $U_{max}$, the same method may be used as that for determining the value of $U_p$ and the radii in the facet 18D. Thus, for example, to determine the value of U for the facet 18E, the value of X' is that of half of a diagonal and that the value of Y' is equal to $U_{max}$ minus the length of two diagonals of the squares. Thus, the length of the hypotenuse 41 is the value for U in the facet 18E and it is in a vertical plane in FIG. 3B in which its radius $R_c$ extends. For this value of U, the angle $\theta$ may be determined in the vertical plane 41 so as to determine the respective values of $R_s$ and $R_c$.

From the foregoing, it is clear how the value of U may be obtained for the other center points of the nine facets. It should be noted that each of the vertical planes in FIG. 3B, passing through the axis and a center point, is at a corresponding angle $\phi$ with the plane represented by the line 36.

Figure 4:
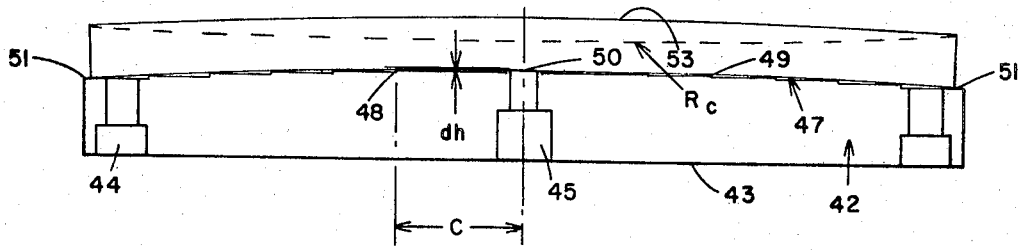
FIG. 4 is a side-elevational view of a jig for forming a facet according to the invention.
Figure 6:
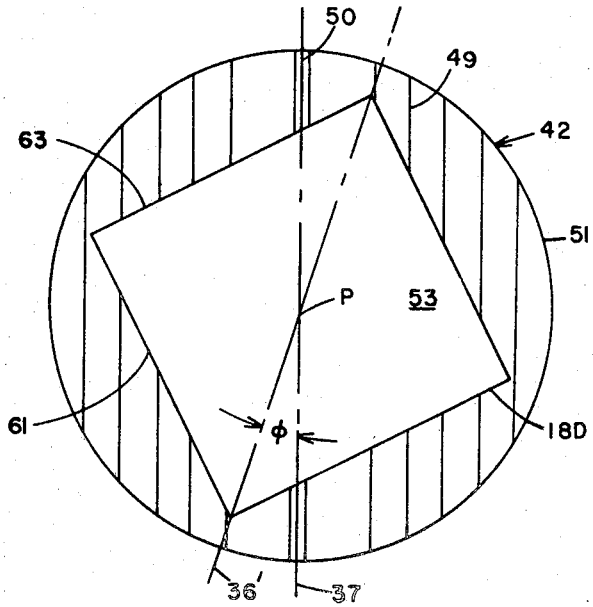
FIG. 6 is a plan view of the jig shown in FIG. 4 with the facet plate, shown in FIG. 3C, positioned thereon.

After the radii for the facets are determined, they are used to determine the configuration of a facet jig 42, shown in FIGS. 4 and 6, on which facet surfaces are formed. There is a separate jig for each facet depending upon its radii, but the same jig may be used for corresponding left and right hand facets with respect to line 36. Each jig is generally circular and has a flat bottom 43. The upper face of the jig is formed so that a facet plate secured thereon by bolts, extending through holes 44 and 45 and threadedly engaged in tapped wells in the bottom of the plate, can be deformed within its elastic limit to mate with a cylindrical arc generally designated as 47, the arc being formed by the flat bottom base of the facet when it is secured against the outer edges of each of the steps as 48 and 49. That is, the arc 47 could be drawn so as to pass over each of the steps and the apex 50 as well as the opposite laterally outside nadirs as 51. The steps are spaced at equal intervals on both sides of the axis of the cylindrical arc 47 or of the apex of the jig.

The arc 47 is determined for each facet according to its radii $R_s$ and $R_c$. Each substantially paraboloidal face on the facet is formed by cutting a spherical contour on the facet face 53 on a facet as 18D positioned on the jig. The spherical curvature is determined by the long radius, $R_c$. That is, the shape of the concave spherical cut into the facet face has a radius equal to $R_c$. When that has been accomplished, the facet is removed from the jig and it returns to its undeformed shape due to the energy stored therein when it was deformed on the jig within its elastic limit. The facet face 53, after being removed from the jig, is no longer spherical but has a substantially paraboloidal face, defined by two radii in orthogonal planes. When the facet plate springs back to its undeformed shape, the curvature is formed in the face 53 and its radius is equal to $R_s$. When the facet is removed from the jig, its bottom should be flat and if it is not, it must be cut to be flat. It is then put back on the jig and the spherical cut is made again. The jig is of sufficient thickness so that its deflection relative to that of the facet is insignificant.

Figure 5:
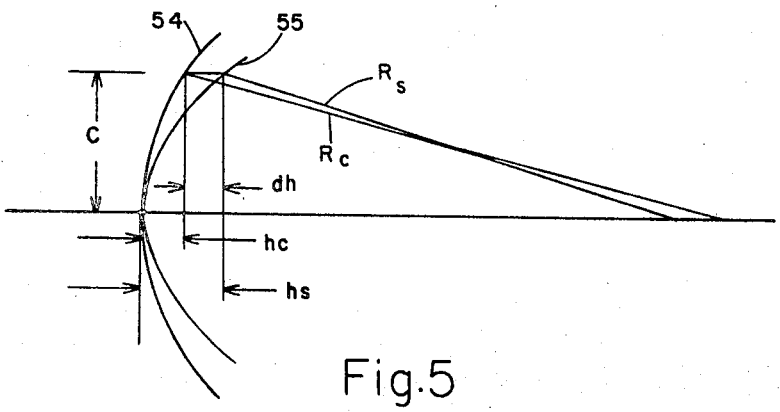
FIG. 5 is a diagrammatic view illustrating the geometry from which the jig calculations are determined for a single facet of a known parabola.

The jig is prepared so that the proper radii and the orthogonal planes will define its substantially paraboloidal surface. The configuration of the jig is determined in reference to FIG. 5. There the large arc 54 has a radius $R_c$ and the small arc 55 has a radius $R_s$. The distance C is the distance laterally outwardly from the apex 50 for any step edge on the jig, or stated differently, the distance out from the apex at which a point on the cylindrical curve 47 will be formed so as to deform the facet plate. The distance $h_s$ indicates the deformation that is required to form the arc 55 on the jig at a point C and the distance $h_c$ indicates the deformation that is required on the jig to form the arc 54 at a point C on the jig. The distance $dh$ is the difference in deformation required between the two arcs, or $$dh = h_s - h_c = \frac{C^2(R_c - R_s)}{2R_c R_s}$$

determined from the right angle triangles in FIG. 5.

When the radii are known, $dh$, the depth of any step downwardly from the apex 50 on the jig, is determined by selecting an arbitrary value for C, the distance laterally outwardly perpendicular to the axis of the jig or cylindrical surface to be formed. The values for $dh$ are relatively small in the making of a two-foot square facet. For example, where the radii are 482 and 525 inches, and C is 4 inches, $dh$ is equal to 0.0014 inch, and where C is 15.5 inches, $dh$ equals 0.0204 inch. The jigs also could be made to be concave, in which the spherical cut would be for the short radius $R_s$ and the plate would be deflected into the concavity for the spherical cut.

The various facets are positioned on their respective jigs in accordance with the relationship of the central plane or line 36 which forms diagonals for the facets 18 A, B and C, and the angle $\phi$ for a respective facet. For the facets 18A, B and C, the angle $\phi$ is 0; and they are positioned on a jig with their diagonals, along a plane 36, directly above and parallel to the axis of the cylindrical arc 47.

The other plates from which the facets are to be made are positioned on the jigs so that their center points are crossed by the axis of the arc of the cylinder. In FIG. 6, for example, the plate 18D is rotated on the jig so that the diagonal 36′, parallel to the reference plane 3b, through its center P forms the angle $\phi$ with the cylindrical axis of the jig arc which is in the position of the line 37 in FIG. 3B. The angle $\phi$ is determined for the facet 18D, for example, as indicated in FIG. 3B, by the equation:

$$\phi = \tan^{-1} \frac{X}{Y}$$

For facet 18E, X′ and Y′ are used to solve for $\phi$. In this situation, as shown in FIG. 6, the angle $\phi$ is to the left of the cylindrical axis at the lower part of the drawing whereas for the facets on the left of the line 36 in FIG. 3B, the angle $\phi$ would be formed to the right of the cylindrical axis.

Figure 8:
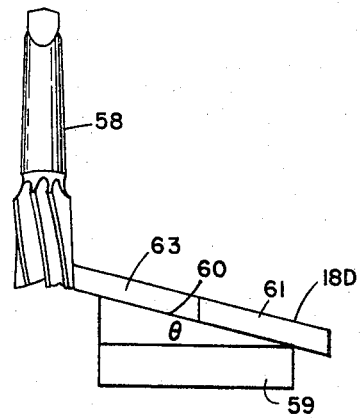
FIG. 8 is a side-elevational view of the facet plate, shown in FIG. 3C, in position for cutting the edges of the plate.

Prior to fastening the plates to the jigs, the plates being somewhat larger than a two foot square, they must be milled along their edges to form a two foot square when viewed along a line parallel to the parabolic axis. As shown in FIG. 8, this is accomplished by placing the plate on a support 59 having an upper surface 60 slanted at an angle $\theta$ equal to that for the respective facet as determined by the value of U. Further, the plate is rotated or positioned with respect to its angle $\phi$ in the same manner as it is on the jig with reference to the plane 36 and its corresponding plane, as 37 for facet 18D. A milling cutter 58 is then applied to the outer edges as 61 and 63 of the plate, and moved to cut a two foot square, the cutter being in a position to make a vertical cut, or stated differently, in a position parallel to the axis of the parabola. This then makes a two foot square when viewed from a position parallel to the parabolic axis. When viewed as indicated in FIG. 3C, the plate, having finished edges, has the appearance of a parallelogram and not a square. Two of the sides of the facets as they would be viewed in FIG. 3C, except for the facets 18A, 18B and 18C, are slightly longer than the other two sides. The facets 18A, 18B, and 18C have respective equal sides, as 24.5297, 24.3026 and 24.1379 inches.

Figure 7:
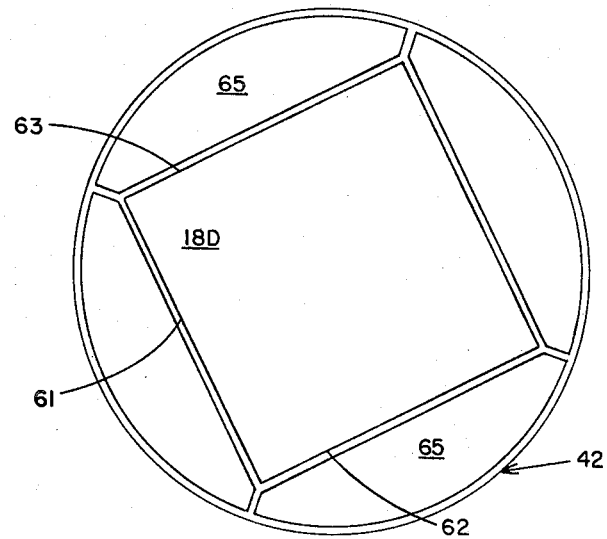
FIG. 7 is a plan view of the jig and plate shown in FIG. 6 with fill-in pieces arranged around the plate for obtaining a continuous mill cut on the face of the plate.

After the edges of a facet plate are cut, the facet is positioned on its jig as indicated above, and sectors 65 are placed on the facet as shown in FIG. 7 so that when the spherical surface is cut, the cut across and around the facet will be continuous as the cutting tool passes back and forth over the outer edge of the facet plate.

After the surfaces of the nine facets have been cut and polished for reflective purposes, they are assembled in their specific locations as indicated in FIG. 3B and put together to form the collimator as shown in FIGS. 1 and 9.

It is clear that the foregoing method for making a substantially paraboloidal collimator from substantially paraboloidal facets is considerably less expensive in both time and money than the manufacture of a collimator in one piece formed to have a paraboloidal or a substantially paraboloidal face.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example.

I claim:
1. A method for producing a surface on a flat plate defined by two radii in orthogonal planes, comprising:
  (a) deforming a flat plate within its elastic limit so that it has a first predetermined, approximately cylindrical face and an opposite approximately cylindrical face;
  (b) producing a spherically concave surface having a predetermined radius in said first face;

(c) releasing said plate from its deformity; and
(d) producing in said first face a surface defined by said first radius and a second predetermined radius, said radii being in orthogonal planes.

2. The method according to claim 1 including:
maintaining a flat surface on said opposite face after said plate has been released from its deformity.

3. A method for producing a substantially paraboloidal surface on a flat plate defined by two radii in orthogonal planes, comprising:
   (a) preparing a jig face for producing a predetermined approximately cylindrical surface on a flat plate when the plate is deformed thereon;
   (b) securing a flat plate on said jig surface to deform the plate within its elastic limit so that it has a first predetermined approximately convex cylindrical face and an opposite approximately concave cylindrical face;
   (c) producing a spherically concave surface having a predetermined radius in said first face;
   (d) unsecuring said plate from said jig; and
   (e) producing in said first face a surface defined by said first radius and a second predetermined radius, said radii being in orthogonal planes.

4. The method according to claim 3 including:
   (a) securing sectors on said jig to provide a substantially circular configuration of said sectors and said plate, said sectors being flush with said first face of said plate; and
   (b) producing said spherical concave surface of said first face by cutting said plate and sectors with a continuous cut with a cutting tool.

5. The method according to claim 3 including:
maintaining a flat surface on said opposite side of said plate.

6. The method according to claim 3 in which:
   (a) said jig face is prepared by putting steps from a central apex downwardly toward opposite sides symmetrically to nadir outer edge positions;
   (b) said steps extending in an axial position relative to the axis of the cylindrical faces formed on the plate; and
   (c) the outer edge of each step providing an axial line on which the plate makes contact when secured to the jig and thereby deformed.

7. The method according to claim 6 in which:
the depth of each step from the apex is determined from the equation:

$$dh = \frac{C^2(R_c - R_s)}{2R_s R_c}$$

where $dh$ is the depth of each step; $C$ is the transverse distance normal to said axis from the central apex to each step edge, arbitrarily selected; $R_c$ is the radius used to cut the spherical surface in the first face of the plate and the first parabolic radius which defines the finished face in said orthogonal planes; and $R_s$ is the second parabolic radius which defines the finished face in said orthogonal planes and which comes into existence when the plate is released after being cut and has sprung back to its undeformed condition.

8. The method according to claim 7 in which:
said plate is secured to said jig by screws extending through the jig and into the plate, the screws when tightened having deformed the plate within its elastic limit to form said cylindrical surfaces.

References Cited
UNITED STATES PATENTS 2,384,638  9/1945  Penberthy.
3,186,271  6/1965  Kaiser _____ 83—19 X FRANK T. YOST, Primary Examiner U.S. Cl. X.R.

51—284; 76—107; 83—176